United States Patent [19]

Sawada et al.

[11] Patent Number: 4,820,077
[45] Date of Patent: Apr. 11, 1989

[54] FRAMING BAR CONNECTOR FOR A FRAME

[75] Inventors: Nobuyoshi Sawada; Kenji Takeshima, both of Toyama, Japan

[73] Assignee: Origin Co., Ltd., Tokyo, Japan

[21] Appl. No.: 58,468

[22] Filed: Jun. 5, 1987

[51] Int. Cl.$^4$ .............................................. B25G 3/36
[52] U.S. Cl. ..................... 403/402; 403/401; 40/155
[58] Field of Search ................ 403/401, 402; 40/155, 40/152

[56] References Cited

U.S. PATENT DOCUMENTS 3,492,034  1/1970  Skipp ............................. 40/152 X
4,610,565  9/1986  Nakayama ........................ 403/402

FOREIGN PATENT DOCUMENTS 62-42463  3/1987  Japan.

Primary Examiner—Andrew V. Kundrat
Attorney, Agent, or Firm—Flynn, Thiel, Boutell & Tanis

[57] ABSTRACT

A framing bar connector for firmly connecting adjacent framing bars of a frame through a simple action without requiring any special tool. The framing bar connector is formed in the shape of a bifurcate lever having a pair of legs each provided at the respective free ends thereof with eccentric cams, respectively. In assembling a frame, the eccentric cams are inserted in dovetail grooves formed in the backsides of the adjacent framing bars, respectively, and then the bifurcate lever is fully turned down, so that the eccentric cams engage firmly with the respective bottom surfaces of the dovetail grooves and the inner surfaces of flanges defining the dovetail grooves, respectively, to connect the adjacent framing bars firmly.

18 Claims, 6 Drawing Sheets

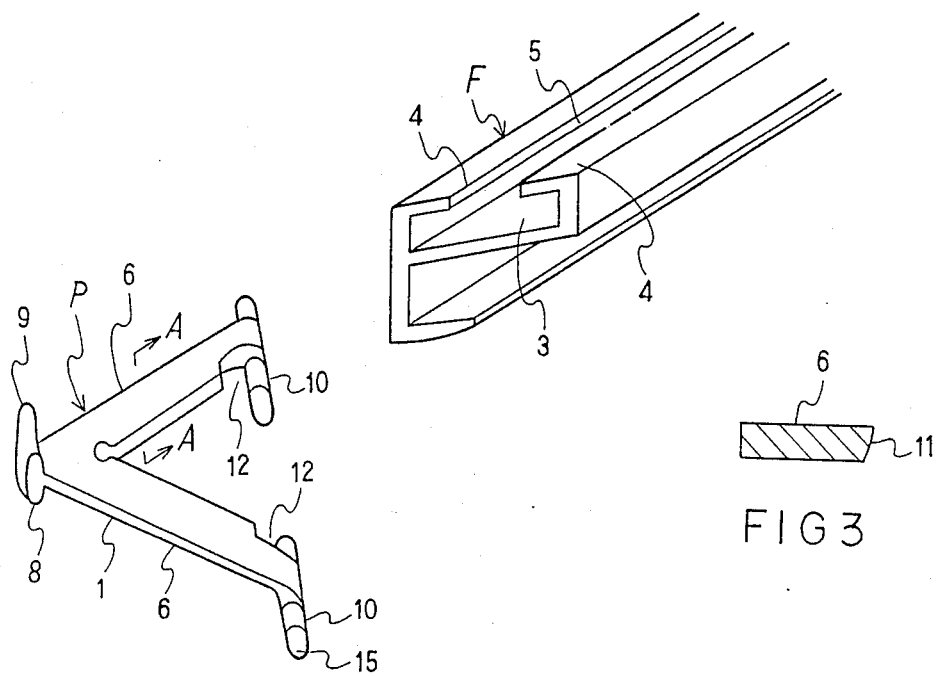
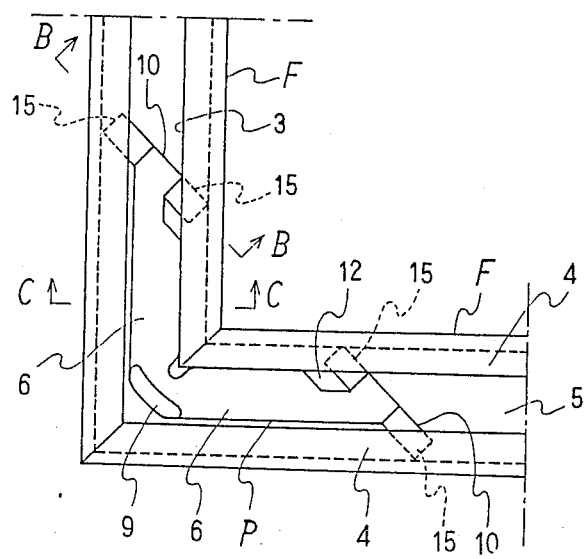
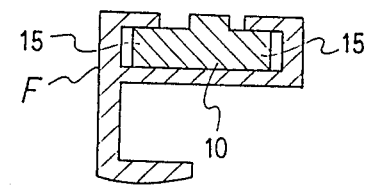
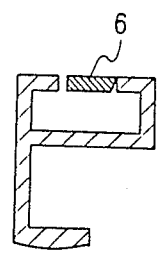
FIG 1
FIG 2
FIG 3
FIG 4
FIG 5

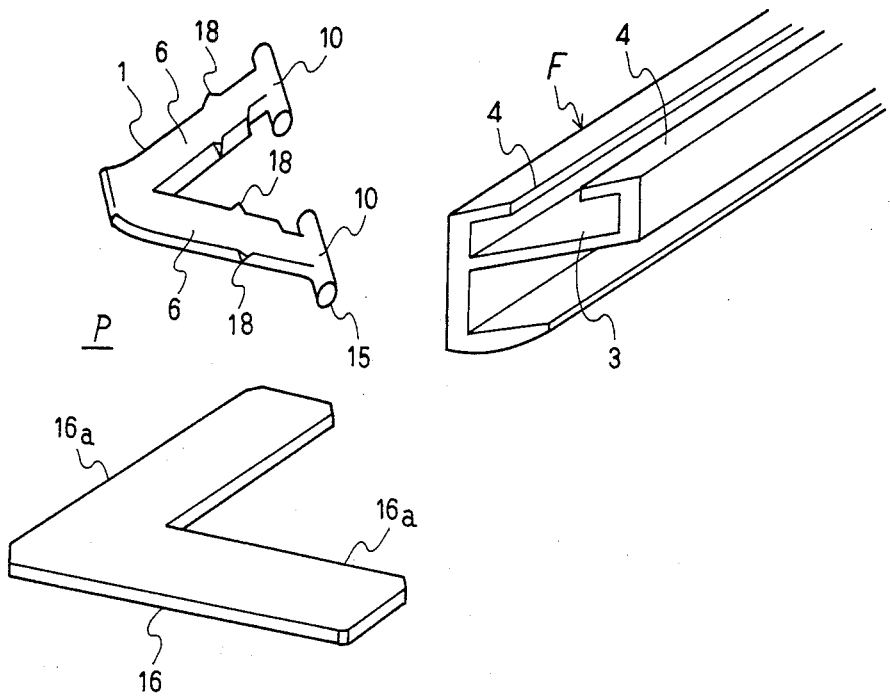
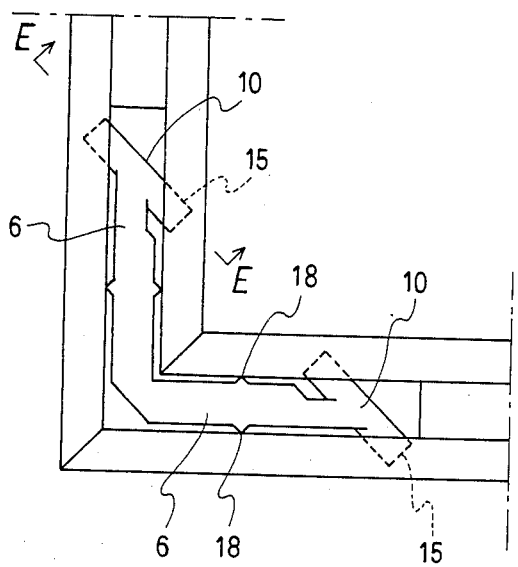
FIG 13
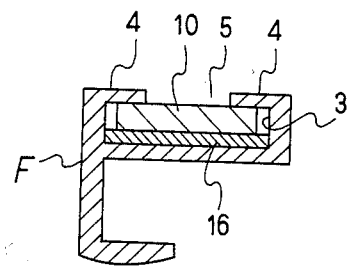
FIG 15
FIG 14

FRAMING BAR CONNECTOR FOR A FRAME

BACKGROUND OF THE INVENTION

1. Field of the Invention:

The present invention relates to a framing bar connector for connecting adjacent framing bars of a frame for framing a picture or the like.

2. Description of the Prior Art:

Generally, the conventional frame for framing a picture or the like is assembled by inserting a L-shaped connecting plate in dovetail grooves formed in the adjacent framing bars, respectively, and fastening the L-shaped connecting plate to the adjacent framing bars by fastening means. In most cases, the fastening means employs screws; the screws are screwed through threaded holes formed in the L-shaped connecting plate to press the tips of the screws against the bottom surface of the dovetail grooves of the framing members and to screw up the L-shaped connecting plate to press the same against the inner surfaces of the inner flanges of the framing members.

Such fastening means, however, has disadvantages that the screws need to be screwed with a screw driver requiring much time to assemble the frame and, such a mode of assembling a frame is inefficient in assembling many frames to replace pictures framed in the frames with other pictures in art museums and at an exhibition. That is, with some kind of frames, the frames must be disassembled in replacing a framed article with another, and then the frame is assembled again, so that replacing the framed article with another requires much time.

SUMMARY OF THE INVENTION

The present invention has been made in view of the foregoing problems of the conventional frame and it is therefore an object of the present invention to provide a framing bar connector capable of firmly connecting or disconnecting the adjacent framing bars of a frame in an instant with a single action.

To achieve the object of the invention, the present invention provides a framing bar connector having the shape of a bifurcate lever having a pair of legs formed so as to engage dovetail grooves formed in the adjacent framing bars, respectively, and each provided at the free end thereof an eccentric cam which firmly engages the bottom surface of the corresponding dovetail groove and the inner flanges of the corresponding framing bar when the pair of legs are turned down to connect the adjacent framing bars firmly.

In connecting the adjacent framing bars of a frame, the eccentric cams of the framing bar connector are inserted into the dovetail grooves of the framing bars with the bifurcate legs in an upright position, then the opposite ends of the framing bars are placed in contact with each other, and then the framing bar connector is turned down, so that the eccentric cams engage the framing bars firmly.

BRIEF DESCRIPTION OF THE DRAWINGS

The above and other objects, features and advantages of the present invention will become more apparent from the following description taken in conjunction with the accompanying drawings, in which:

FIG. 1 is a perspective view of a framing bar connector, in a first embodiment, according to the present invention;

FIG. 2 is a fragmentary plan view showing one of the corners of a frame assembled by means of the framing bar connector of FIG. 1;

FIG. 3 is an enlarged sectional view taken on line A—A in FIG. 1;

FIG. 4 is a sectional view taken on line B—B in FIG. 1;

FIG. 5 is a sectional view taken on line C—C in FIG. 1;

FIG. 13 is a perspective view, similar to FIG. 1, of a framing bar connector, in a fourth embodiment, according to the present invention;

FIG. 14 is a plan view, similar to FIG. 2, of the framing bar connector of FIG. 13;

FIG. 15 is a sectional view taken on line E—E in FIG. 14;

DESCRIPTION OF THE PREFERRED EMBODIMENTS

Figure 6:
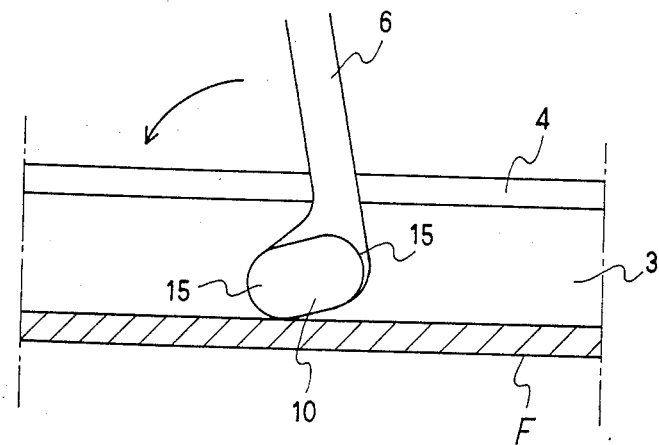
FIGS. 6 and 7 are views of assistance in explaining a manner of assembling a frame by means of the framing bar connectors of FIG. 1.

First Embodiment (FIGS. 1 to 7):

Referring to FIGS. 1 to 7, a framing bar connector P is a bifurcate lever 1. A dovetail groove 3 is formed in the backside of a framing bar F. A pair of flanges 4 are formed in the backside of the framing bar F to define a narrow opening 5. The bifurcate lever 1 has a pair of legs 6 of the same length and a stem extending from the junction of the pair of legs 6. Eccentric cams 10 are provided coaxially with each other at the free ends of the pair of legs 6, while a foot 8 and a knob 9 are formed at the free end of the stem. The width of the pair of legs 6 is slightly smaller than the width of the opening 5, namely, the gap between the flanges 4. The inner sides 11 of the legs 6 are cut in an inclined surface so that the width of the backsides of the legs 6 is smaller than that of the front side of the same. Recesses 12 are formed in the respective free ends of the legs 6 to reduce the width of the respective free ends of the legs 6 so that the legs 6 will not interfere with the flanges 4 in inserting the eccentric cams 10 into the dovetail grooves of the adjacent framing bars F with the legs 6 in an upright position.

Each eccentric cam 10 is formed so that the axis thereof is perpendicular to the corresponding leg 6, and has projecting parts 15 projecting from the opposite sides of the free end of the leg 6. The foot 8 projects from the backside of the stem in a direction in which the bifurcate lever 1 is turned in firmly connecting the adjacent framing bars F. The height of the foot 8 is such that the legs 6 extends substantially in parallel to the outer surfaces of the flanges 4 when the extremity of the foot 8 is brought into contact with the bottom surface of the dovetail groove 3. The knob 9 projects from the free end of the stem in a direction opposite to the direction of projection of the foot 8.

Figure 7:
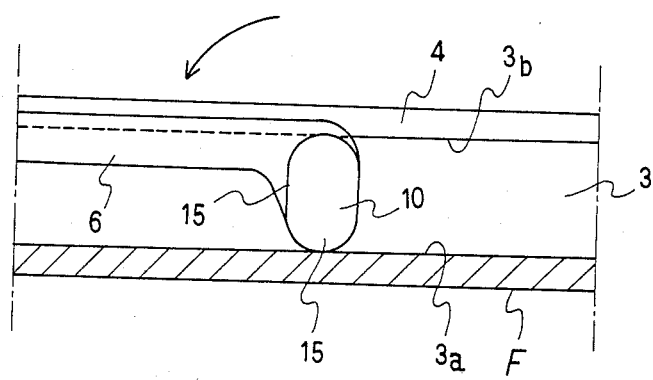

In connecting the framing bars F with the framing bar connector P, the eccentric cams 10 are inserted into the dovetail grooves 3 of the adjacent framing bars F, respectively, with the pair of legs 6 in an upright position as shown in FIG. 6, and thereby the free ends of the adjacent framing bars F are brought into abutment with each other when the eccentric cams 10 are put in place. Then, bifurcate lever 1 is turned down toward the junction of the adjacent framing bars F, whereby the eccentric cams 10 firmly engages the bottom surfaces 3 of the dovetail grooves 3 and the inner surfaces 3b of the flanges 4, respectively, as shown in FIG. 7 to connect the adjacent framing bars F firmly. When the bifurcate lever 1 is fully turned down, the eccentric cams 10 are held in place and the pair of legs 6 are received in the dovetail grooves 3 of the adjacent framing bars F, respectively.

Since the inclined surfaces 11 of the pair of legs 6 are pressed firmly against the inner edges of the flanges 4 when the bifurcate lever 1 is fully turned down, the free ends of the framing members F are pressed firmly against each other.

Figure 8:
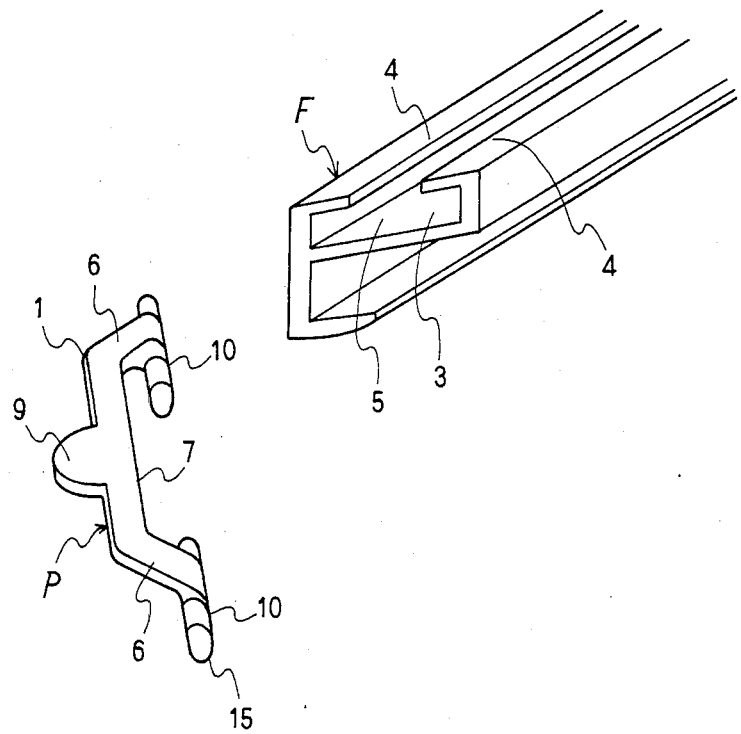
FIG. 8 is a perspective view, similar to FIG. 1, of a framing bar connector, in a second embodiment, according to the present invention.
Figure 9:
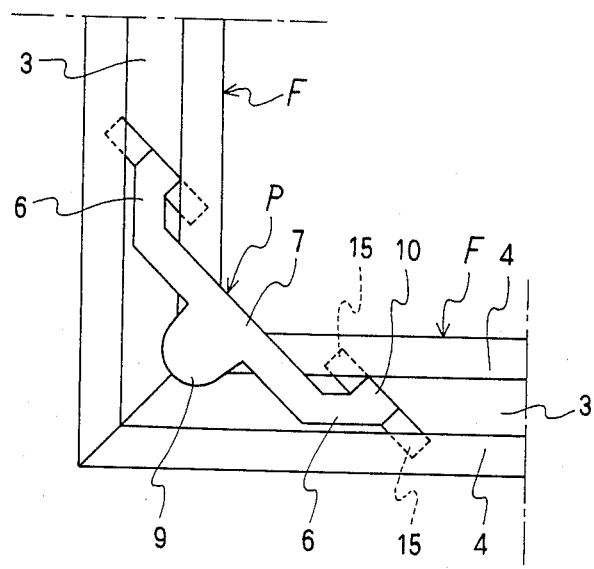
FIG. 9 is a plan view, similar to FIG. 2, of the framing bar connector of FIG. 8.

Second Embodiment (FIGS. 8 and 9):

Referring to FIGS. 8 and 9, a framing bar connector P is a bifurcate lever 1 having a stem 7, a pair of legs 6 extending from the opposite ends of the stem 7, respectively, and a lug 9 projecting from the middle of the stem 7 in a direction opposite the direction of extension of the legs 6. The manner of connecting adjacent framing bars with this framing bar connector P is similar to that described wither reference to the first embodiment, and hence the description thereof will be omitted.

Figure 10:
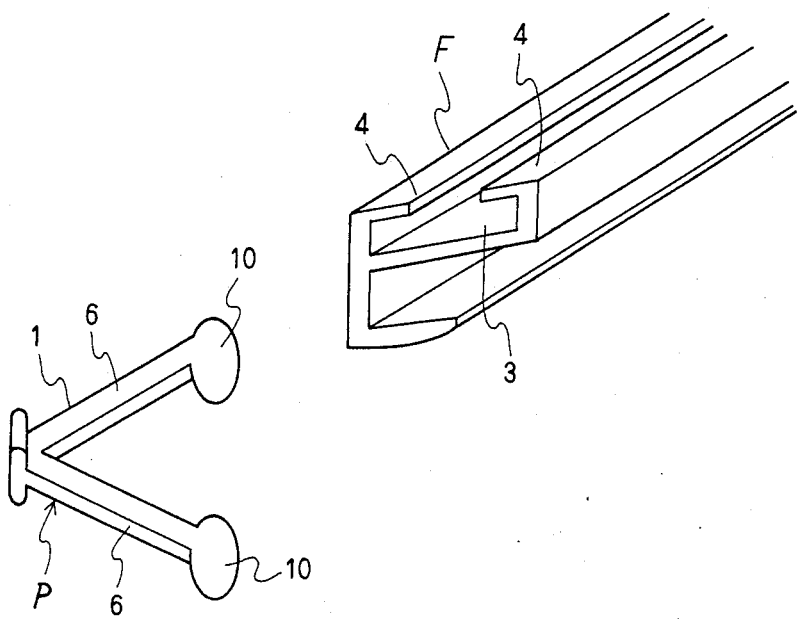
FIG. 10 is a perspective view, similar to FIG. 1, of a frame bar connector, in a third embodiment, according to the present invention.
Figure 11:
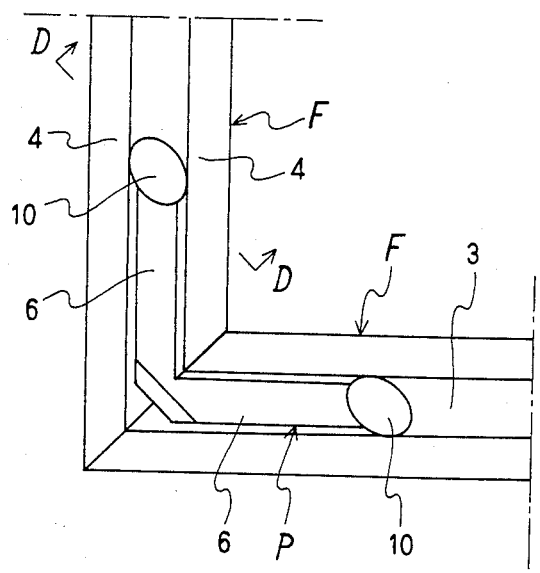
FIG. 11 is a plan view, similar to FIG. 2, of the framing bar connector of FIG. 10.
Figure 12:
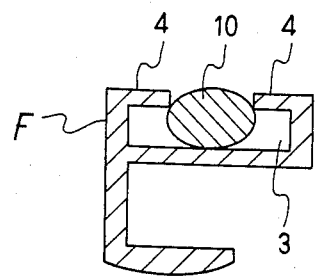
FIG. 12 is a sectional view taken on line D—D in FIG. 11.

Third Embodiment (FIGS. 10 to 12):

Referring to FIGS. 10 to 12, a framing bar connector P in the third embodiment is substantially the same as that in the first embodiment in construction and function, except that this framing bar connector P is provided with ellipsoidal cams 10 instead of the eccentric cams at the free ends of the pair of legs 6. The function of this framing bar connector P is the same as that of the first embodiment.

Fourth Embodiment (FIGS. 13 to 15):

Referring to FIGS. 13 to 15, a framing bar connector P comprises a bifurcate lever 1 and an L-shaped connecting plate 16. The bifurcate lever 1 is substantially the same as that of the first embodiment in construction and function. In assembling adjacent framing bars F of a frame, the legs 16a of the L-shaped connecting plate 16 are inserted in the respective dovetail grooves 3 of the adjacent framing bars F, respectively, and then the legs 16a of the L-shaped connecting plate 16 are pressed against the bottom surfaces of the dovetail grooves 3 by turning down the bifurcate lever 1 in the same manner as described with reference to the first embodiment, so that the adjacent framing bars F are connected more stably as compared with those connected by the foregoing embodiments. Naturally, the foregoing embodiments may be provided with such an L-shaped connecting plate. In the fourth embodiment, sharp projections 18 projects from the respective opposite side surfaces of the lower portions of the legs 6, respectively, and the sharp projections 18 cut in the edges of the flanges 4 of the framing bars F when the bifurcate lever 1 is fully turned down in place, to hold the legs 6 securely in place, so that the firm connection of the adjacent framing bars F is maintained.

Figure 16:
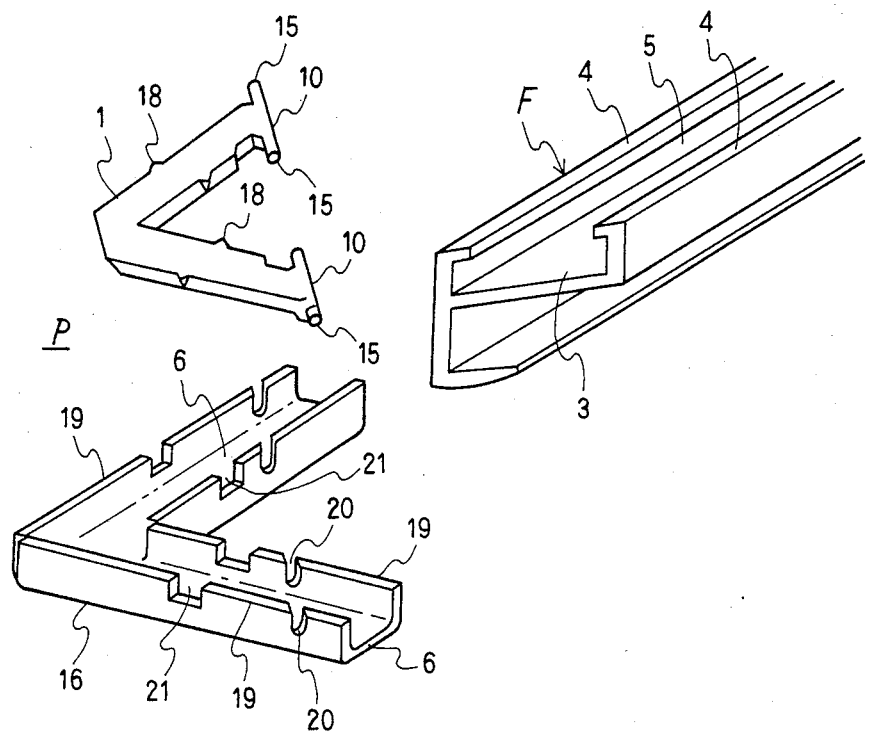
FIG. 16 is a perspective view, similar to FIG. 1, of a framing bar connector, in a fifth embodiment, according to the present invention.
Figure 17:
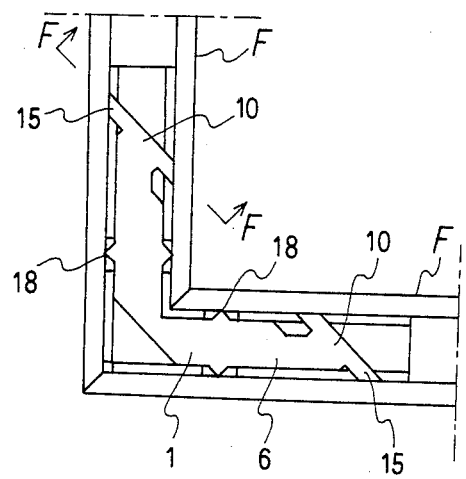
FIG. 17 is a plan view, similar to FIG. 2, of the framing bar connector of FIG. 16.
Figure 18:
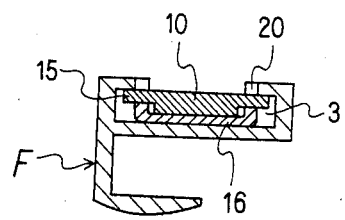
FIG. 18 is a sectional view taken on line F—F in FIG. 17.

Fifth Embodiment (FIGS. 16 to 18):

Referring to FIGS. 16 to 18, a framing bar connector P comprises a bifurcate lever 1 and a connecting plate 16. The bifurcate lever 1 has a pair of legs each provided at the free end thereof with an eccentric cam 10 having pivots 15 projecting from the opposite ends thereof and having a diameter smaller than that of the eccentric cam 10. The connecting plate 16 is an L-shaped channel having legs 6. Recesses 20 are formed in the flanges 19 of the legs 16a of the connecting plate 16 to receive the pivots 15 therein. Sharp projections 18 project from the opposite side surfaces of the legs of the bifurcate lever 1. Recesses 21 are formed in the flanges 19 of the legs 16a of the connecting plate 16 to receive the sharp projections 18 therein, respectively.

In assembling a frame, the pivots 15 of the bifurcate lever 11 are placed in the corresponding recesses 20 of the connecting plate 16 to combine the bifurcate lever 1 and the connecting plate 16, then the combination of the bifurcate lever 1 and the connecting plate 16 are inserted in the respective dovetail grooves 3 of the adjacent framing bars F, and then the bifurcate lever 1 is fully turned down to press the connecting plate 16 against the bottom surface of the dovetail grooves 3 with the eccentric cams 10, so that the framing bars connected firmly. The function of this embodiment is the same as the foregoing embodiments.

Thus, according to the present invention, a frame can be assembled simply by inserting the eccentric cams or equivalent formed at the respective free ends of the legs of the bifurcate lever in the dovetail grooves of the adjacent framing bars of the frame and fully turning down the bifurcate lever without requiring any special tool and any additional work.

Although the invention has been described in its preferred embodiments with a certain degree of particularity, the present invention is not limited thereto in practical application and it is to be understood to those skilled in the art that many changes and variations are possible in the invention without departing from the scope and spirit thereof.

What is claimed is:

1. An apparatus comprising two adjacent framing bars which each have a dovetail groove opening thereinto between two flanges defining a backside thereof, each said groove having on a side opposite said flanges a bottom surface and having on each said flange an inner surface which faces said bottom surface, and a framing bar connector which includes a bifurcate lever having a pair of legs each having at a respective free end thereof a pivot cam which is disposed in a respective said groove and moves into firm engagement with the bottom surface and one of the inner surfaces of the groove when the lever is turned about an axis from a position in which said legs project rearwardly from said framing bars to a position in which outer surfaces of said legs are flush with outer surfaces of said flanges.

2. An apparatus as recited in claim 1, wherein said cams are eccentric cams.

3. An apparatus as recited in claim 1, wherein said cams are ellipsoidal cams.

4. An apparatus comprising two adjacent framing bars which each have a dovetail groove opening thereinto between two flanges defining a backside thereof, each said groove having on a side opposite said flanges a bottom surface and having on each said flange an inner surface which faces said bottom surface, and a framing bar connector which includes a bifurcate lever having a pair of legs each having at a respective free end thereof a pivot cam and which includes an L-shaped connecting plate having two legs which are each inserted in the dovetail groove in a respective said framing bar, each said cam being disposed in a respective said groove and being moved to a position engaging at least one of the inner surfaces and firmly pressing a respective said leg of said connecting plate firmly against the bottom surface of the dovetail groove when the bifurcate lever is turned about an axis from a position projecting rearwardly from the framing bars to a position in which outer surfaces of said legs are flush with outer surfaces of said flanges.

5. An apparatus as recited in claim 4, wherein said cams are eccentric cams.

6. An apparatus as recited in claim 4, wherein said cams are ellipsoidal cams.

7. An apparatus as recited in claim 4, wherein said legs of said connecting plate each have thereon two spaced flanges provided with respective recesses which pivotally receive respective pivot projections projecting in opposite directions from a respective said leg of said lever.

8. A connector, comprising a unitary connecting element having two leg sections, said leg sections each having a free end portion in the region of a pivot axis about which said connecting element can be pivoted an each extending from said free end portion in a direction away from said axis, said free end portions being spaced from each other along said axis, and each said leg section of said connecting element having thereon pivot cam means which includes a cam surface eccentric to said axis.

9. A connector as recited in claim 8, wherein said pivot cam means on each said leg section includes a cam part projecting axially outwardly from said free end portion of such leg section, said cam par having thereon said cam surface.

10. A connector as recited in claim 9, wherein each said leg section has two said cam parts thereon which project axially outwardly in opposite directions from opposite sides of said leg sections.

11. A connector as recited in claim 9, wherein each of said leg sections has a recess therein adjacent said cam part thereon.

12. A connector as recited in claim 8, wherein each said leg section has an inclined surface on a side thereof facing the other leg section.

13. A connector as recited in claim 8, wherein each of said leg sections has at a location spaced from said axis an outwardly projecting pointed projection.

14. A connector as recited in claim 8, wherein each said leg section has a further end portion at an opposite end thereof from said free end portion, said further end portions of said leg sections being integrally fixedly secured to each other.

15. A connector as recited in claim 8, wherein each said leg section has a further end portion at an opposite end thereof from said free end portion and wherein said connecting element has a stem which extends between and is integrally fixedly secured to said further end portions of said leg sections.

16. A connector as recited in claim 8, including an L-shaped connect plate having two legs which each have thereon a surface, each said cam being slidably engageable with the surface on a respective said leg of said connect plate.

17. A connector as recited in claim 8, including an L-shaped connect plate having two legs which each have thereon two spaced flanges, each said flange having therein a recess, and each said free end portion of each said leg section having outwardly projecting pivot parts on opposite sides thereof, said pivot parts each being rotatably received in a respective said recess in said flanges of said connect member so as to pivotally support said connecting element on said connect plate.

18. A connector according to claim 17, wherein each said flange on said connect plate has a further recess spaced from said first-mentioned recess therein, and wherein each said leg section of said connecting element has outwardly projecting pointed projections on each side thereof at locations spaced from said pivot axis, said connecting element being pivotal relative to said connect plate to a position in which said projections are each disposed in and projecting through said further recess in a respective said flange.

* * * * *

UNITED STATES PATENT AND TRADEMARK OFFICE
CERTIFICATE OF CORRECTION

PATENT NO. : 4,820,077

DATED : April 11, 1989

INVENTOR(S) : Nobuyoshi SAWADA et al

It is certified that error appears in the above-identified patent and that said Letters Patent is hereby corrected as shown below:

Column 5, line 34; change "an" to ---and---.

Column 5, line 44; change "par" to ---part---.

Signed and Sealed this

Ninth Day of January, 1990

Attest:

JEFFREY M. SAMUELS

Attesting Officer     Acting Commissioner of Patents and Trademarks